June 12, 1928.
S. M. PHELPS
1,673,300
PROCESS FOR THE PHOTOGRAPHIC REPRODUCTION OF OBJECTS
IN THEIR NATURAL COLORS OR IN MONOCHROME
Filed Dec. 18, 1923        2 Sheets-Sheet 1
FIG. I.
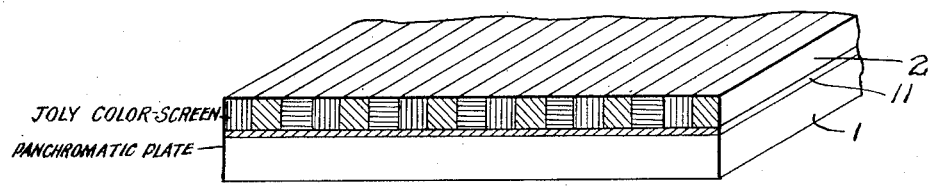
FIG. II.
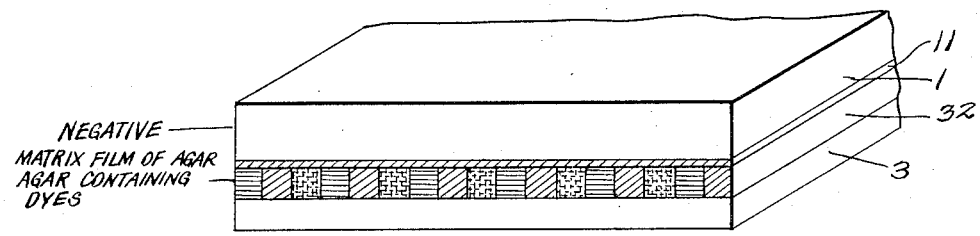
FIG. III.
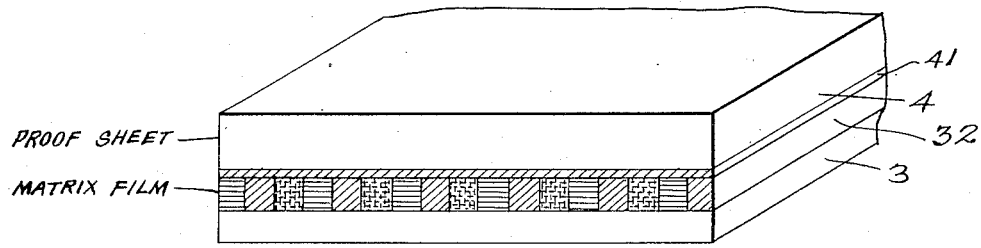
FIG. IV.
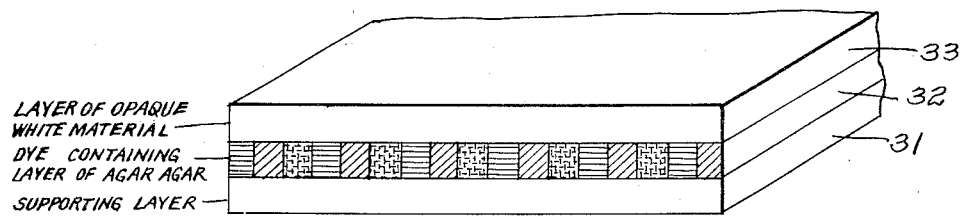
WITNESSES
INVENTOR
Stuart M. Phelps,
by Christy & Christy,
Attys.

June 12, 1928.
S. M. PHELPS
1,673,300
PROCESS FOR THE PHOTOGRAPHIC REPRODUCTION OF OBJECTS
IN THEIR NATURAL COLORS OR IN MONOCHROME
Filed Dec. 18, 1923
2 Sheets-Sheet 2
FIG. V.
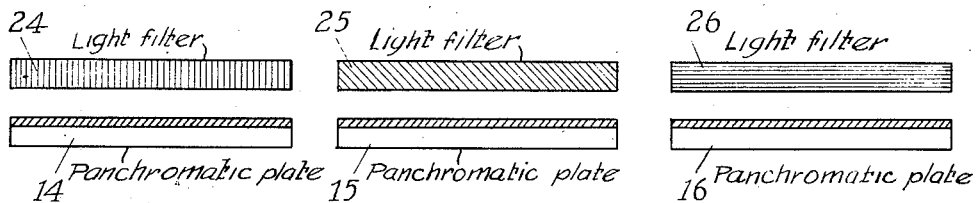
FIG. VI.
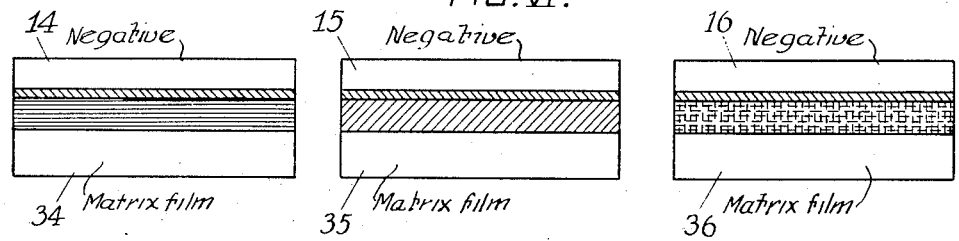
FIG. VII.
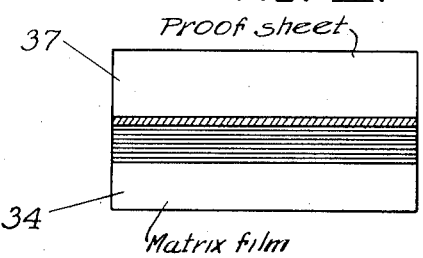
INVENTOR
Stuart M. Phelps
by Christy and Christy
his attorneys Patented June 12, 1928.

1,673,300

UNITED STATES PATENT OFFICE.

STUART M. PHELPS, OF PITTSBURGH, PENNSYLVANIA.

PROCESS FOR THE PHOTOGRAPHIC REPRODUCTION OF OBJECTS IN THEIR NATURAL COLORS OR IN MONOCHROME.

Application filed December 18, 1923. Serial No. 681,416.

In photography, by the use of proper color filters any color may be analyzed into its primary colors, and records made which, when recombined, will reproduce the original color. This general procedure is used in all of the practical color processes.

Two methods at least are in use by which colors are analyzed, to obtain photographic records of their primary constituents. In one, three separate plates are exposed successively, using three different mono-colored filters in the path of light which enters the camera. The colors of these several filters are the usual red, green, and blue-violet primary colors of the spectrum. Positives from the three plates so produced are placed in a lantern, and colored light (the proper color for each) is projected through them, and the images are superposed upon the screen. There on the screen the photograph appears in approximately natural colors. In the second method, a single screen is used colored with all of the three primary colors. The colors are distributed regularly over the screen, occupying separate and definite areas in the form of a minute pattern which covers the entire surface of the screen. If a panchromatic plate be faced with such a color-screen and then exposed, a record will be obtained on a single "black and white" negative, and over properly disposed areas, of the primary colors of the light which enters the camera, each color being recorded at its proper relative value. If then a transparent positive, produced from the negative so obtained, be faced with the same color screen, the patterns upon screen and upon positive being properly registered, and the picture be then viewed by transmitted light, the picture will be seen in approximately natural colors.

Up to the present time there has not been developed a simple practical method of utilizing the negative or negatives produced by either of the above procedures to obtain a colored positive print which will show clearly and accurately the original colors of the objects photographed. By the process which is the subject of this invention it is possible to obtain in a thoroughly practical and simple manner, clear and accurate prints in the natural colors.

The second of the two methods indicated above is the simpler. The problem hitherto has been (and to it my present invention is addressed) to obtain from the negative a print in color, a print which in itself and without the aid of a second color screen presents in natural colors the picture.

In the accompanying drawings Figs. I, II, and III illustrate diagrammatically, and in perspective, the successive steps of the operation which involves my invention. Fig. IV similarly shows a certain film modified in permissible manner from the typical form first hereinafter described. Figs. V, VI, and VII illustrate diagrammatically and in elevation the successive steps of an alternative procedure, which also constitutes a following out of my invention.

My invention involves an application of the principle that under certain conditions (of such nature as presently will be indicated) a dyed substance which normally holds its color fast, as against washing out, may upon or in consequence of exposure to light be made to release its color, so that the color may be washed away or utilized. I shall in the further course of this specification speak of the dyes as being initially insoluble and ultimately soluble. And I shall use these terms in their popular and not necessarily in their scientific and technical sense. Initially the dye is insoluble in that it cannot be washed away; ultimately it is soluble, in the sense that it may be washed away. I shall by way of example describe one particular application of this principle, and shall in the course of description indicate how variations are permissible—variations in the choice of materials and deviations in the method of procedure. All this without departing from what is fundamental and essential to my invention.

The example will show how by my process a print may be obtained which will afford in natural colors a picture of the object photographed. The finished print will contain colors combined according to the well known "subtractive" process. Suitable blue-green, magenta, and yellow dyes will be combined on it in proportions and amounts corresponding to the light values recorded on the negative under the red, green, and blue-violet of the color-screen.

The steps involved are, first, the production on a panchromatic plate and with the use of the color-screen of a negative; second, the superposition of this negative upon a specially prepared film, hereinafter described and referred to as the matrix-film, and exposing; third, removal of the matrix-film from the negative; fourth, bringing to contact with the exposed matrix-film an especially impregnated and treated sheet, on which the colored print is to be produced. This sheet is hereinafter referred to as the proof-sheet. Finally, the proof-sheet is washed.

Referring first to Fig. I of the drawings, 1 indicates diagrammatically a panchromatic plate, ordinarily of glass or other transparent material covered with a sensitized film 11; 2 is a color screen, and consists essentially of a transparent sheet colored in alternate lines of red, green, and blue-violet of proper absorption spectra. This is the well known Joly color screen. The plate 1, faced with the color screen 2, as shown in Fig. I, is exposed, and after exposure the color screen is removed and the plate is developed in the usual way, and so becomes a negative.

The matrix film is prepared with colors complementary to those of the color-screen and in a pattern exactly corresponding to that of the color-screen; in place of the red, green, and blue-violet areas of the color-screen, the matrix-film is over corresponding minute areas colored blue-green, magenta, and yellow. The dyes incorporated in the matrix-film are initially insoluble; but conditions are such that after exposure to light (either immediately or after further treatment) the dyes of the matrix-film become more soluble.

Upon the sensitized matrix-film the negative is laid, with the film 11 of the negative in immediate contact with the agar agar surface of the matrix film and with accurate registration of areas. Those areas of the negative which bear record of the light which during the exposure passed through the red area of the color screen now register with those areas of the matrix-film which carry blue-green dye; those areas of the negative which bear record of green light register with the magenta areas of the matrix-film; and those areas which bear record of blue-violet light register with the yellow areas of the matrix-film. Fig. II is a diagrammatic showing of the negative in place upon the matrix-film. The matrix-film is here indicated to consist of a layer 32 of dye-containing agar agar spread upon a supporting layer to which the reference numeral 3 is immediately applied. The film 11 of the negative will be seen to be in immediate contact with the agar agar layer 32 of the matrix-film. When the negative has so been placed upon the sensitized matrix-film, exposure is made. On exposure of the matrix-film to light, when thus arranged beneath the negative, a photochemical reaction occurs, and to the extent that light has penetrated the matrix-film, the dyes of the matrix-film are (either immediately or in consequence of subsequent treatment) set free and may be washed away or, as is the case in the further progress of the operation, absorbed away. And it will be perceived that the dyes thus released at different points over the surface of the matrix-film are released in amounts proportionate to the quantity of light which at these points has penetrated the negative. When such exposure has been made, the negative is removed from the matrix-film.

The proof-sheet consists of a sheet of suitable material to constitute a support or carrier,—paper, for example, or glass—coated with a suitable colloidal material, such as gelatin. It is moistened with a solution in a manner described later in detail, and when so moistened is pressed against the matrix-film, after the matrix-film has been exposed, as above described. Fig. III shows diagrammatically a matrix-film 3 (which, as will be understood, has already been exposed under a negative, as described above) and the proof-sheet 4 pressed upon it. The colloidal coating of the proof-sheet is indicated at 41, and it will be seen that in applying the proof-sheet to the matrix-film this coating makes contact upon the color-bearing agar agar face of the matrix-film. As the solution with which the proof-sheet has recently been moistened, permeates the matrix-film, the dyes, which are now released in varying degree, as the result of exposure, in proportion to the amount of light which has struck the various portions of the matrix-film, migrate from the matrix-film to the colloidal coating of the proof sheet, and by diffusing sufficiently produce, by the subtractive method, the picture in its natural colors.

The proof sheet may after color absorption as above described and after removal from the matrix-film be impregnated with chemicals which fix the dyes thus transferred to it. It may then be washed to remove undesirable chemicals, and dried.

There are a number of modes by which the matrix-film may be prepared, so that the dyes which at first are "fixed" may by the action of light be released, so that later they may migrate to the proof-sheet. Of these modes I shall describe several. It is, however, to be understood that the invention is not limited to particular modes described, but includes the general practice of employing dyes which, initially insoluble, are as a result of a photochemical reaction released or made soluble. Initially the colors are "fast"; ultimately they are released and may be washed away. The materials employed are such that before the matrix-film is exposed to light the dyes are held in such manner that they are insoluble in a given solvent; after exposure they are soluble in the same solvent.

The matrix-film is formed preferably of agar agar spread upon a suitable support, as for instance a film of celluloid. The dyes which the film of agar agar contains may be held by a mordant sensitive to light, a mordant which on exposure to light loses its mordant power. Such a substance is silver ferricyanide.

A refinement upon this general operation is permissible, a refinement by which the operation is rendered more sensitive and practical. The matrix-film may be made to contain, in addition to the dyes, mordanted by silver ferricyanide, or its equivalent, a substance which on exposure to light is changed and becomes a reactive agent upon silver ferricyanide, destroying it, and to the extent that it destroys the silver ferricyanide, setting free the dye. Such a substance is ferric oxalate. On exposure to light it becomes ferrous oxalate, and ferrous oxalate in turn reacts upon silver ferricyanide and forms compounds which are relatively ineffective as mordants. The dyes then are liberated, to the extent that the chemical reaction indicated takes place.

Instead of silver ferricyanide, hydrochloroauric acid may be used, or chloroplatinic acid, and with like effect. But these substances last named must be associated with such a substance as ferric oxalate, which on exposure to light is changed to a substance reactive with hydrochloroauric acid or chloroplatinic acid. In the ensuing claims I shall use the phrase "an acid of which hydrochloroauric acid is typical" to define the alternative substances here considered.

A matrix-film may, therefore, be prepared in the following manner: hydrochloroauric acid is added to a solution of agar agar and then a solution of the proper basic dye is added. In this way separate colloidal solutions in agar agar of the three suitable dyes in an insoluble form are prepared. By mechanical operations these severally colored preparations of agar agar, are deposited upon a desirable support, such as a celluloid film, over properly disposed areas, in successive lines (or other designs) of blue-green, magneta, and yellow. After the agar agar layer is dry, it preferably is coated over with a thin layer of gelatin, although this is not necessary. The gelatin may contain such a sensitive reagent as ferric oxalate. Sometimes it is preferable to apply the sensitive reagent to the coating upon the agar agar layer, just before using. Gelatin is used for this coating because ferric oxalate is photochemically more sensitive in it than in agar agar. Gelatin, however, is not so desirable as a vehicle for the dye, since hydrochloroauric acid (for instance) coagulates gelatin. And for other reasons agar agar is a preferable vehicle for the dyes. It is not as absorbent (at least it is not in so great a degree as is gelatin) of the basic dyes when they are released. Thus, when agar agar is used as the carrier, the released dyes are more easily absorbed by the proof-sheet.

After the matrix-film overlain by the negative has been exposed to light and after the negative has been taken away, the proof-sheet is brought into face-to-face contact with the matrix-film. The proof-sheet consists essentially of a suitable support, of paper, glass, celluloid, or other substances, coated with a layer of an absorbent colloid, such as gelatin, capable of absorbing from the matrix film the dyes therein contained which have been released or rendered "soluble". Before application to the martix-film the proof-sheet is moistened, and this moistening is preferably done with a solution of potassium oxalate. A solution of potassium oxalate is used, that it may moisten the matrix-film and dissolve the ferrous oxalate, and thus facilitate its action in changing the mordant. In consequence of the reactions indicated the dyes originally held fast in the matrix-film are released, and under the conditions which obtain (the two wet colloidal layers lying in face-to-face contact), the released dyes migrate sufficiently to the proof-sheet. This migration of the dyes is properly termed "imbibition".

When the reactions indicated have taken place and the dyes to the extent that, or in proportion as they have been released have migrated to the proof-sheet, the proof-sheet is separated from the matrix-film and the dyes which the proof-sheet then bears are fixed, so that they will not diffuse further when the print is washed to remove the extraneous materials.

Any suitable mordant or fixing agent may initially be incorporated in the colloid of the proof-sheet, and any one of many fixing agents may ultimately be used, such for instance as plastic clays, sulphonated oils, a tannate, etc. Such an agent being added in suitable manner, the dyes are by it held, both from washing out and from further diffusing or spreading to adjacent parts of the film.

If the matrix-film has been properly prepared a number of proof-sheets may easily be printed from it in the manner described.

I have indicated that such a substance as ferric oxalate may be present in the matrix-film as initially prepared, in order to increase the effect of light upon the dye-holding mordant. Manifestly the ferric oxalate or its equivalent might be borne by the proof-sheet instead, and in that case it would become effective only after exposure and bringing together in proper registry and in wet contact of the surfaces of matrix-film and proof-sheet. I have said that the matrix-film may carry ferric oxalate, or its equivalent as a mordant-changing agent, and that the proof-sheet may carry potassium oxalate, or its equivalent as a reagent with the ferric oxalate. Manifestly this may be reversed, and the matrix-film may carry the potassium oxalate (or its equivalent), and the proof-sheet the ferric oxalate (or its equivalent).

An alternative procedure is the following:—The matrix-film may be prepared by coating a suitable support with an absorbent colloid such as agar agar in which is incorporated the dye, held by a mordant sensitive to light or susceptible to a reaction with a product of a photochemical reaction, and then coating this initial layer with a second layer or film of opaque white material which hides the color of the dye-holding layer beneath, thus presenting a white surface. This is illustrated in Fig. IV, where in a diagrammatic way a matrix-film of the particular character here under consideration is shown alone, and its composition is shown. The supporting layer is designated 31, the dye-containing layer of agar agar is designated 32, and the coating layer of opaque white material, 33.

The dyes liberated as a result of the exposure and ensuing process migrate to this white layer and form the colored image.

The opaque white coating may be prepared by incorporating a suitable white opaque pigment in gelatin. The gelatin coating may act not merely as the absorbent for the released dye, but it may also act as the vehicle for such substance as may be used to render the sensitizer more sensitive, the vehicle for the ferric oxalate, that is to say. Also, the dye released by or in consequence of exposure will be absorbed by this gelatin more readily than by agar agar.

The principles of the general process described apply to this procedure.

The registry of the negative (obtained by the use of a color-screen) on such a matrix-film as that last described may be accomplished by the use of an index border on the matrix-film,—a narrow band of the film uncoated with the opaque white material.

After exposure the film is treated with a suitable developing agent for the mordant which also allows the dyes released or made "soluble" to diffuse sufficiently to produce a picture according to the "subtractive" color principle. The dyes may then be fixed to prevent further diffusion on washing the print. In this manner, pictures in their natural colors can be obtained by the use of one negative and one printing film.

In the case of color reproduction by the use of three separate negatives (the first of the two methods mentioned above, the same principles apply. Three separate matrix-films are made, each containing one of the three dyes. After being severally exposed beneath the three negatives, they are brought in successive contact with one and the same proof-sheet, care being taken that each comes to proper register upon the proof-sheet. This gives the three dyes properly combined on one color print. This process, however, is more difficult to manipulate than the screen-filter process first described.

The procedure last outlined is in a diagrammatic way illustrated in Figs. V, VI, and VII. Three plates 14, 15, and 16, are exposed beneath three light filters 24, 25, and 26, the three filters being colored severally each of a single color, red, green, and blue-violet, for example. When the plates have been developed and have become negatives, three mono-colored matrix-films are exposed beneath them severally. The colors of the matrix-films are severally complementary to the colors of the filters under which the plates have severally been exposed. This preparation of three matrix-films is indicated in Fig. VI, where the negative 14, which may be understood to have been exposed behind a red filter is shown to be applied to a matrix-film 34 which may be understood to bear green pigment; the negative 15, exposed behind a green filter, is applied to a matrix-film 35 which bears magenta pigment; and the negative 16 exposed behind a blue-violet filter, is applied to a matrix-film bearing green pigment. When the three matrix-films have so been exposed, a single proof-sheet 37, Fig. VII, is applied to and properly registered upon each of the three matrix-films in turn, and with each such application transfer of pigment occurs, and in the identical manner already described, the whole transfer being effected in three cumulative steps instead of in one single step. The procedure in other respects is identical with that first described. Fig. VII shows the proof sheet applied to one only of the three matrix-films. It will be understood that it is applied in like manner and successively to the other two.

Monochrome prints may of course be produced from an ordinary negative, merely by preparing the matrix-film throughout all its surface with a single color, and following in other respects the procedure described. Sufficient illustration of the particular procedure here described may be had by reference to Figs. V, VI, and VII. A single negative is prepared, for instance the negative 14 of Fig. VI. This negative may have been exposed beneath a ray filter or it may have been exposed without any ray filter at all. This negative is applied to a single matrix-film, such as 34, Fig. VI, and exposure follows. The negative is removed and the proof-sheet 37, Fig. VII, is applied to the matrix-film in its place. These successive steps are taken under the conditions and with the particular effects already described. The result, manifestly, is a monochrome picture on the proof-sheet.

Variety in effects may be obtained by choosing as material for the proof-sheet substances of coarser or finer texture, of varying surface finish, or color.

In the ensuing claims and in defining the matrix-film, I use the phrase, "a mordant sensitive to light", and I means to include in that term a single substance, such as silver ferricyanide, hydrochloroauric acid or chloroplatinic acid, and also a mixture of substances such as either of these mixed with or associated with ferric oxalate, for example, the mordant character being possessed by one substance primarily and the sensitiveness being possessed by another substance primarily, and the effect of the mixture being the same, so far as concerns the ends in view, as the effect of a single substance.

I claim as my invention:

1. The method of photographic printing herein described which consists in preparing a matrix-film in which a dye is held by a mordant sensitive to light, printing from a negative upon the film so prepared, and transferring from the matrix-film to another surface the dye released in consequence of exposure.

2. The method of photographic printing herein described which consists in preparing a matrix film in which a dye is held by a mordant sensitive to light, printing from a negative upon the film so prepared and transferring by imbibition the dye released by such exposure to an absorbent surface brought into contact with the matrix-film.

3. The method of photographic color-printing herein described which consists in preparing a matrix-film in which dyes of a plurality of colors disposed over separate and predetermined areas are held by a mordant sensitive to light, subjecting the so prepared matrix-film to a printing operation under a negative whereon over corresponding areas separate color values are recorded, and allowing the released dyes to migrate to an adjacent colloidal film.

4. The method of color photography herein described which consists in producing upon a panchromatic plate and through a color-screen a negative in which the color components of the light employed are severally recorded over distinct areas, printing from such negative upon a vari-colored matrix film, in which complementary colors are distributed over corresponding areas, and in which the dyes are held by a mordant sensitive to light, and transferring from the matrix-film to another surface the dye released by exposure.

5. The method of color photography herein described which consists in producing upon a panchromatic plate and through a color-screen a negative in which the color components of the light employed are severally recorded over distinct areas, printing from such negative upon a correspondingly vari-colored matrix-film, in which the dyes are held by a mordant sensitive to light, and transferring by imbibition to an absorbent surface the dyes released by such exposure.

6. The method of photographic printing herein described which consists in printing a negative upon a matrix-film in which the dye is held by a mordant sensitive to light which itself is susceptible to a reducing reaction, and then bringing into contact with the exposed matrix-film and in the presence of a solution with which the exposed mordant is reactive a moistened sheet of colloidal material.

7. The method of photographic printing herein described which consists in printing a negative upon a matrix-film in which dye is held by a mordant sensitive to light which itself is after exposure susceptible to chemical reaction, and then bringing into contact with the exposed matrix-film a moistened sheet of colloidal material containing a substance with which the exposed mordant is reactive.

8. The method of photographic printing herein described which consists in printing a negative upon a matrix-film in which dye is held by a mordant in the presence of a substance sensitive to light, which being changed by light becomes reactive with the mordant, and then after reaction has taken place transferring to another surface the released dye.

9. The method of photographic printing herein described which consists in printing a negative upon a matrix-film in which a dye is held insoluble by the use of hydrochloroauric acid, called a mordant, in the presence of a substance sensitive to light, which substance being changed by light becomes reactive with the mordant, and transferring to another surface the dye released consequent upon exposure to light.

10. The method of photographic printing herein described which consists in printing a negative upon a matrix-film in which dye is held by hydrochloroauric acid as a mordant in the presence of a substance sensitive to light which substance being changed by light becomes reactive with the mordant, and then bringing into contact with the exposed matrix film, and in the presence of a salt which assists the reaction between the mordant and the substance changed by light, a moistened sheet of colloidal material.

11. The method of photographic printing herein described which consists in printing a negative upon a matrix-film in which in the presence of ferric oxalate the dye is held by an acid of which hydrochloroauric acid is typical, as a mordant, and then bringing into contact with the exposed matrix-film a sheet of colloidal material moistened with a solution of potassium oxalate.

12. The method of photographic printing herein described which consists in preparing a film of agar agar in which dye is held by a mordant, coating the film with a film of gelatin in which is contained a salt sensitive to light, the derivative from which after exposure to light is reactive with said mordant, printing a negative upon the film so compounded, and transferring by imbibition to another surface the dye released by reaction.

13. The method of photographic printing herein described which consists in preparing two films of colloidal material, one of them carrying dyes held by a mordant, one of them carrying a light-sensitive substance whose derivative after exposure to light is reactive with the mordant, printing a negative upon the film which carries the light-sensitive substance, and bringing the two films together in face-to-face contact, after exposure of one of them as already indicated, thereby causing migration of dye to occur from film to film in quantities proportionate to light penetration in the printing operation.

14. A sensitive film for photographic work which consists of a layer of absorbent material in which a dye is held by a mordant, and in which is also present a substance which on exposure to light is changed and which being so changed becomes reactive with the mordant.

15. A sensitive film for photographic work which consists of a layer of absorbent material in which a dye is held by a mordant reactive with ferrous salt, thus losing its property as a mordant, and in which a ferric salt sensitive to light also is present.

16. A sensitive film for photographic work which consists of a layer of agar agar spread upon a suitable support and carrying dye held by a mordant sensitive to light.

17. Two films of colloidal material adapted to cooperative use in producing photographic prints in color, one of said films carrying dyes held by a mordant, one of them carrying a light-sensitive substance whose derivative after exposure to light is reactive with the mordant.

In testimony whereof I have hereunto set my hand.

STUART M. PHELPS.